May 23, 1933.  V. M. LUTZ  1,910,926
STEERING DEVICE FOR MOTOR VEHICLES
Filed May 11, 1931
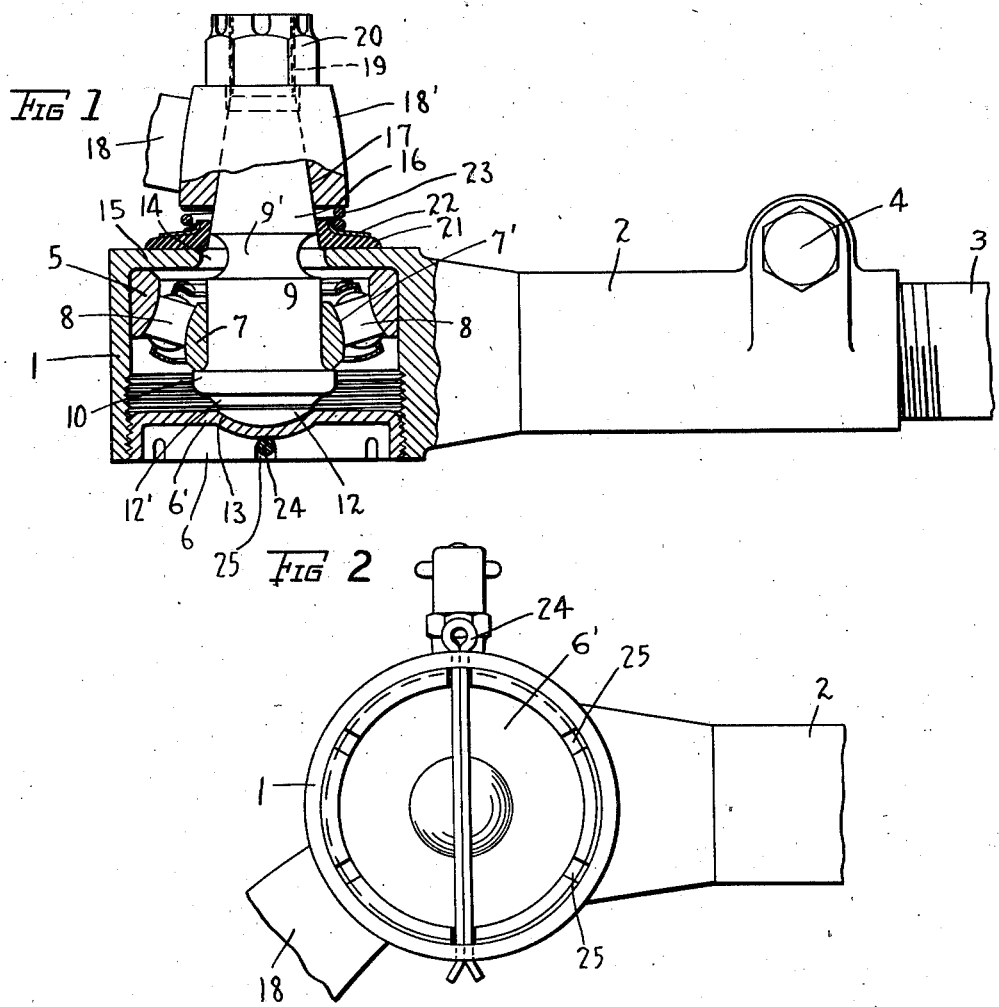

Patented May 23, 1933

1,910,926

UNITED STATES PATENT OFFICE

VERGIL M. LUTZ, OF URBANA, OHIO

STEERING DEVICE FOR MOTOR VEHICLES

Application filed May 11, 1931. Serial No. 536,489.

This invention relates to improvements in steering gear connections for automotive vehicles, it more particularly relating to the manner of employing anti-friction roller bearings in such connections as the tie-rod and the drag-link.

At present, the use of some form of the ball-and-socket principle in steering gear connections is almost universal, there being the necessity that ease of movement must be assured at all times regardless of road conditions. In the adjustment of such types, even in new cars, a certain small amount of "play" is necessary to preserve the freedom of movement, which play in itself should be regarded as a depreciation corresponding to many miles of legitimate wear, and is, moreover, often productive of objectionable noise.

In the instance of the older cars the wear is most prominently noticeable on the surfaces that are in contact when the steering wheels are in straight driving alignment, as the greater percentage of any driving is over a normally straight course, and, when re-adjustments are made, care must be taken to allow tolerance for turns of short radius, as the surfaces that received less wear are apt to come into contact and cause binding of the parts.

In my improved construction I employ preferably an anti-friction, self-aligning roller bearing in order to avail myself of the known advantages of this type of bearing (the mounting of which in connection with a peculiarly shaped stud comprising the gist of the present invention). By my combination of these parts in the preferred as well as in the modified form of the invention, in which I use a double-row bearing, I am enabled to eliminate entirely all play or necessary tolerance, tending to afford longer periods of time between readjustments, as in such mechanical connections as have been mentioned, in the performance of the functions for which they have been designed, wear is promoted, and even aggravated, by any play whatever.

In the accompanying drawing:

Fig. 1 is an elevation, partly in section, of a tie-rod connection in which the improved features are incorporated, such a connection being particularly adapted for use in the steering gear mechanism of a motor vehicle, only so much of the connection as is needed being shown.

Fig. 2 is a bottom plan view of the same.

Referring to the drawing, 1 represents a cylindrical, cup-shaped housing which is joined, preferably by welding, to the tubular, sleeve-like portion 2, the member 2 being interiorly threaded to receive the threaded end of the rod 3 which is retained in proper adjustment by the clamp bolt 4. The interior of the housing is bored to receive the outer race 5 of a self-aligning bearing, while the lower portion of the housing is threaded to receive a threaded plug 6. The inner race is indicated at 7, while 8, 8 represent the rollers, having concave peripheries to conform to the races, it being understood that there is a plurality of such rollers spaced about between the inner and outer races. The inner race is pressed on the cylindrical portion of the stud 9 against a flange collar 10, and, in assembly, the rollers are placed in the outer race, while the stud with the inner race thereon is positioned on the rollers, after which the plug 6 is threaded into the housing 1.

It will be noticed that the lower portion of the stud 9 is provided with a convex boss 12, which is, in reality, a spherical segment, while the upper portion of the plug 6 is machined to have a concave depression 13 to receive the boss 12, the radii to which each is machined being substantially equal. Further, the center of the radius of the boss 12 is also the center of the bearing surface 7' of the inner race, which surface, referring to its contour, may be termed the zone of a sphere.

The body portion of the stud 9 is inserted outwardly through an opening 14 in the closed end 15 of the housing 1, and, in order that the housing may have ample movement relative to the stud in all directions, a groove 9' is machined in the stud adjacent the position of the circular edge of the opening 14. The flange collar 10 is somewhat larger in diameter than the opening 14, thereby insuring that accidental disassembly may not occur in the event of a complete bearing failure.

It will be further noticed that a neck 12' is provided between the spherical boss 12 and the flange collar 10. This is for the purposes of providing that a shoulder will not be worn on either the boss or the spherical seat during the mutually gyratory movements of the boss and seat, the spherical area of the boss being limited to and governed by, the area of the seat, or vice versa.

The stud 9 is machined as at 16 to enter and fit into a tapered bore 17 in the boss 18', which may be, for instance, the end portion of a steering arm 18, and is further provided with a threaded, reduced diameter portion 19 on which a nut 20 is utilized to rigidly secure the stud in the steering arm.

Between the closed end 15 of the housing 1 and the under side of the boss 18', a lubricant retainer, such as a rubber washer 21 is employed. The washer 21 is held in position by an interposed coiled spring 23 bearing against a metallic plate 22. The lubricant is thus not only retained, but dirt and water is also excluded.

The plug 6 is threaded upwardly until moderately firm contact with the boss 12 is made, and is then locked in this adjustment by means of the insertion of a pin, such as the split cotter pin 24, which is passed through openings therein and in the lower portion of the housing 1. The plug 6 is preferably a formed sheet metal member, the web 6' of which is in the nature of a diaphragm supported at its edges and bearing a load at its center whereby a comparatively flexible member is obtained. The degree of flexibility depends both on the thickness of the web and the character of the metal of which the plug is made, the purpose of which is to provide to a minor extent that the desired snugness of adjustment is retained with an automatic compensation for the resulting small amount of wear.

From the foregoing description it will be seen that I have provided a simple, effective and inexpensive means for the elimination of the back lash or play heretofore necessary in connections of the type described, by which elimination the life of the connection is lengthened and the time of a necessary readjustment is deferred, while throughout this entire period a more quiet operation is assured.

Having thus described my invention, I claim:

1. In a steering connection, a housing, a connecting rod connected with a side of said housing, a flexible diaphragm forming a closure for another side of said housing, said diaphragm having a threaded connection with the interior of said housing so as to be adjustable with relation thereto, a steering arm stud projecting in said housing through an aperture in a side of said housing opposite to the side closed by said diaphragm, said stud having a spherical bearing surface within said housing, anti-friction devices interposed between said bearing surface and said housing, and a second convex bearing surface on the end of said stud within said housing, said flexible diaphragm having a concave seat to receive said second bearing surface.

2. In a steering connection, a housing having a lateral extension, a connecting rod secured to said extension, a steering arm stud extending through an aperture in the upper portion of said housing having a convex bearing surface within said housing, anti-friction devices interposed between said housing and said convex bearing surface, a second convex bearing surface on the end of said stud in said housing, the lower portion of the interior of said housing being threaded, and a flexible diaphragm having a threaded flange screwed into the bottom of said housing and forming a closure therefor, said diaphragm having a concave seat for said second-mentioned bearing surface and acting to take up wear between said bearing surfaces by an adjustment thereof in said housing.

In testimony whereof, I have hereunto set my hand this 6th day of May, 1931.

VERGIL M. LUTZ.